US012769133B2

(12) United States Patent
Pennell et al.

(10) Patent No.: US 12,769,133 B2
(45) Date of Patent: Oct. 20, 2026

(54) PUPIL RELAY SYSTEM

(71) Applicant: Snap Inc., Santa Monica, CA (US)

(72) Inventors: Brennon Pennell, Canterbury (GB); James Leighton, Abingdon (GB); Nan Ma, Abingdon (GB)

(73) Assignee: Snap Inc., Santa Monica, CA (US)

(*) Notice: Subject to any disclaimer, the term of this patent is extended or adjusted under 35 U.S.C. 154(b) by 224 days.

(21) Appl. No.: 18/812,762

(22) Filed: Aug. 22, 2024

(65) Prior Publication Data

US 2024/0411142 A1 Dec. 12, 2024

Related U.S. Application Data

(63) Continuation of application No. 17/595,299, filed as application No. PCT/GB2020/051239 on May 21, 2020, now Pat. No. 12,196,966.

(30) Foreign Application Priority Data

Jun. 26, 2019 (GB) ...................................... 1909179

(51) Int. Cl.
*G02B 27/01* (2006.01)
*G02B 26/10* (2006.01)
*G02B 27/28* (2006.01)

(52) U.S. Cl.
CPC ....... *G02B 27/0172* (2013.01); *G02B 26/105* (2013.01); *G02B 27/283* (2013.01)

(58) Field of Classification Search
CPC .............. G02B 27/0172; G02B 27/283; G02B 27/0101; G02B 27/0103; G02B 27/0081;
(Continued)

(56) References Cited

U.S. PATENT DOCUMENTS 8,089,568 B1 * 1/2012 Brown ............... G02B 27/0172 349/96
8,472,120 B2 * 6/2013 Border ................. G02B 27/017 359/13
(Continued)

FOREIGN PATENT DOCUMENTS

CN 107329259 11/2017
CN 108415162 8/2018
(Continued)

OTHER PUBLICATIONS

"European Application Serial No. 20729160.0, Response to Communication pursuant to Rules 161(1) and 162 EPC filed Feb. 3, 2022", 49 pgs.
(Continued)

*Primary Examiner* — William R Alexander
(74) *Attorney, Agent, or Firm* — Schwegman Lundberg & Woessner, P.A.

(57) ABSTRACT

A laser scanning projection system comprises a laser source configured to emit light towards a pair of polarizing beam splitters. The polarizing beam splitters direct light to reflect an odd number of times from a plurality of mirrors through one or more quarter waveplates, using a laser scanner comprising a scanning mirror to direct the light across an angular field of view, forming an exit pupil.

20 Claims, 6 Drawing Sheets

(58) Field of Classification Search
CPC ................ G02B 26/105; G02B 26/101; G02B 17/0856; G02B 2027/0127; G02B 2027/015
USPC ....................................................... 359/213.1
See application file for complete search history.

(56) References Cited

U.S. PATENT DOCUMENTS

| | | | | |
|---|---|---|---|---|
| 8,634,139 | B1 * | 1/2014 | Brown | G02F 1/163 359/630 |
| 8,749,890 | B1 * | 6/2014 | Wood | G02B 6/34 359/632 |
| 9,366,864 | B1 * | 6/2016 | Brown | G02B 17/0884 |
| 9,523,852 | B1 * | 12/2016 | Brown | G02B 27/4211 |
| 9,740,013 | B2 | 8/2017 | Amitai et al. | |
| 9,958,684 | B1 | 5/2018 | Robbins | |
| 9,971,150 | B1 | 5/2018 | Robbins | |
| 10,247,943 | B1 | 4/2019 | Yu et al. | |
| 11,366,316 | B2 * | 6/2022 | Yu | G02B 27/0172 |
| 11,733,522 | B2 * | 8/2023 | Stratton | G02B 27/0172 359/630 |
| 12,196,966 | B2 * | 1/2025 | Pennell | G02B 17/0856 |
| 2006/0250582 | A1 | 11/2006 | Piehler | |
| 2012/0075588 | A1 | 3/2012 | Suga | |
| 2012/0218172 | A1 * | 8/2012 | Border | G02B 27/0176 345/8 |
| 2016/0187656 | A1 * | 6/2016 | Amitai | G02B 27/283 359/633 |
| 2016/0195724 | A1 * | 7/2016 | Levin | G02B 5/04 359/484.01 |
| 2016/0349518 | A1 * | 12/2016 | Amitai | G02B 27/28 |
| 2017/0242264 | A1 | 8/2017 | Sissom | |
| 2017/0248790 | A1 | 8/2017 | Cheng | |
| 2018/0088325 | A1 * | 3/2018 | Brown | G02B 27/30 |
| 2018/0120559 | A1 * | 5/2018 | Yeoh | G02B 26/123 |
| 2018/0210205 | A1 | 7/2018 | Grey et al. | |
| 2018/0234675 | A1 | 8/2018 | Cheng et al. | |
| 2018/0275396 | A1 | 9/2018 | Schowengerdt et al. | |
| 2020/0026072 | A1 * | 1/2020 | Brown | G02B 27/0103 |
| 2020/0192088 | A1 * | 6/2020 | Yu | G02B 27/283 |
| 2020/0271931 | A1 | 8/2020 | Ishii et al. | |
| 2022/0197037 | A1 * | 6/2022 | Pennell | G02B 27/0103 |
| 2022/0269072 | A1 * | 8/2022 | Stratton | G02B 17/08 |
| 2022/0317446 | A1 * | 10/2022 | Stratton | G02B 27/0172 |

FOREIGN PATENT DOCUMENTS

| | | |
|---|---|---|
| CN | 109073882 | 12/2018 |
| CN | 109116556 | 1/2019 |
| CN | 109863435 | 6/2019 |
| CN | 109891298 | 6/2019 |
| CN | 213423601 | 6/2021 |
| CN | 113728265 | 11/2021 |
| JP | 2019508743 | 3/2019 |
| JP | 2019069773 | 5/2019 |
| WO | 2008023367 | 2/2008 |
| WO | 2008129539 | 10/2008 |
| WO | 2009085856 | 7/2009 |
| WO | 2019111237 | 6/2019 |
| WO | 2020260853 | 12/2020 |

OTHER PUBLICATIONS

"European Application Serial No. 20729160.0, Indication of deficiencies in a request under Rule 22 EPC mailed Aug. 10, 2022", 2 pgs.
"European Application Serial No. 20729160.0, Invitation to Remedy Deficiencies in a Request Under Rule 22 EPC mailed Sep. 9, 2022", 2 pgs.
"U.S. Appl. No. 17/595,299, Notice of Allowance mailed Sep. 18, 2024", 13 pgs.
"U.S. Appl. No. 17/595,299, Corrected Notice of Allowability mailed Sep. 30, 2024", 2 pgs.
"International Application Serial No. PCT/GB2020/051239, International Search Report mailed Aug. 6, 2020", 4 pgs.
"International Application Serial No. PCT/GB2020/051239, Written Opinion mailed Aug. 6, 2020", 5 pgs.
"International Application Serial No. PCT/GB2020/051239, International Preliminary Report on Patentability mailed Jan. 6, 2022", 7 pgs.
"U.S. Appl. No. 17/595,299, Preliminary Amendment filed Nov. 12, 2021", 8 pgs.
"U.S. Appl. No. 17/595,299, Notice of Allowance mailed May 31, 2024", 13 pgs.
"Chinese Application Serial No. 202080030462.1, Office Action mailed Mar. 20, 2024", w/ English Translation, 16 pgs.
"U.S. Appl. No. 17/595,299, Corrected Notice of Allowability mailed Jun. 10, 2024", 2 pgs.
"Chinese Application Serial No. 202080030462.1, Response filed Jun. 24, 2024 to Office Action mailed Mar. 20, 2024", W/ English Claims, 47 pgs.

* cited by examiner

PUPIL RELAY SYSTEM

CLAIM OF PRIORITY

This application is a continuation of U.S. patent application Ser. No. 17/595,299, filed on Nov. 12, 2021, which is a U.S. national-phase application filed under 35 U.S.C. § 371 from International Application Serial No. PCT/GB2020/051239, filed on May 21, 2020, and published as WO 2020/260853 on Dec. 30, 2020, which claims the benefit of priority to United Kingdom Patent Application Serial No. 1909179.2, filed on Jun. 26, 2019, each of which is incorporated herein by reference in its entirety.

FIELD

The present invention relates to a laser scanning projection system for use in illuminating a waveguide. The present invention also relates to a Virtual Reality or Augmented Reality headset comprising a display having a waveguide, and a laser scanning projection system for use in illuminating the waveguide.

BACKGROUND

The use of waveguides in augmented reality devices is well known. An image is coupled from a light source into the waveguide through an input grating. The wearer of the augmented reality device can view the coupled-in image through the waveguide, superimposing the virtual image on the wearer's view of the real world.

When projecting the image into the waveguide it is important that the exit pupil of the projector coincides with the desired position on the waveguide, such as the input grating on the waveguide. This ensures efficient coupling in of the image and that there is no vignetting.

Although this can be successfully achieved with conventional projectors, when using laser scanning projectors this is not possible. Laser scanning projectors are constrained such that the exit pupil of the projector is on the scanning mirror. Laser scanners often employ off-axis illumination of the scanning mirror. This can cause a problem in that it becomes difficult to move the waveguide close to the scanner without interrupting the illumination beam. Due to the physical displacement between the exit pupil and the input grating, as well as the angular extent of the light exiting the mirror, some of the light will be vignetted and lost. This problem is enhanced for larger fields of view.

One way to overcome this is to relay the pupil using lenses to create an exit pupil at a desired location with respect to an input grating of the waveguide. This might be at the input grating, or in a waveguide stack between multiple input gratings. However, a complex lens system would be required to achieve a successful pupil relay. This would become difficult to do in a compact manner over a reasonable size field of view. This makes the use of laser scanning projectors not feasible for augmented reality displays. This is especially the case for head mounted augmented reality displays which are required to be small, compact, and have a low weight.

The present invention aims to address these issues of using laser scanning projectors for augmented or virtual reality displays.

SUMMARY OF INVENTION

According to an aspect of the invention there is provided a laser scanning projection system for use in illuminating a waveguide of an augmented reality or virtual reality headset, the system comprising: a laser source, configured to emit light; a first polarising beam splitter, configured to receive the light from the laser source; a first quarter waveplate, configured to receive the light from the first polarising beam splitter; a laser scanner comprising a scanning mirror that is pivotably mounted, configured to receive the light from the first quarter waveplate and direct the light across an angular field of view, thereby to form an exit pupil; a second polarising beam splitter, the second polarising beam splitter configured to receive the light from the laser scanner, via the first quarter waveplate and the first polarising beam splitter; a second quarter waveplate, arranged at a first face of the second polarising beam splitter, configured to receive the light from the second polarising beam splitter; a first mirror arranged at the first face of the second polarising beam splitter, the first mirror configured to receive the light from the second polarising beam splitter via the second quarter waveplate, and to reflect the light towards the second polarising beam splitter via the second quarter waveplate; a third quarter waveplate, arranged at a second face of the second polarising beam splitter configured to receive the light from the second polarising beam splitter; a second mirror arranged at the second face of the second polarising beam splitter, the second mirror configured to receive the light from the second polarising beam splitter via the third quarter waveplate after having being reflected by the first mirror, the second mirror configured to reflect the light towards the second polarising beam splitter via the third quarter waveplate; a fourth quarter waveplate, arranged at a third face of the second polarising beam splitter, configured to receive the light from the second polarising beam splitter; a third mirror arranged at the third face of the second polarising beam splitter, the third mirror configured to receive the light from the second polarising beam splitter via the fourth quarter waveplate after having being reflected by the second mirror, the third mirror configured to reflect the light towards the second polarising beam splitter via the fourth quarter waveplate; a waveguide comprising an input, the input configured to receive the light from the first polarising beam splitter via the second polarising beam splitter after having been reflected by the third mirror such that the exit pupil formed at the laser scanner is relayed into the waveguide.

This arrangement of components allows the light incident on the laser scanner to be on-axis. This is achieved by the first polarising beam splitter directing the light from the laser source such that it is incident parallel to the normal of the laser scanning mirror (on-axis), rather than being incident at a glancing angle. This allows the waveguide to be positioned close to the laser scanner without interrupting the illumination beam of light from the laser. In addition, having the light incident on the polarising beam splitters multiple times further enables a compact design to be achieved as the light path is folded. This is advantageous, in a waveguide for applications that require a small size, such as in virtual reality or augmented reality headsets.

In addition, a key benefit is that on-axis illumination reduces the maximum distortion of the beam by the scanning mirror, removing the need to correct the distortion.

The laser scanning system ensures that the pupil defined by the scanning mirror is relayed as an exit pupil into the waveguide. In addition, the laser scanning projection system arrangement allows control of the image size/exit pupil size, in the waveguide. This is achieved whilst ensuring that the exit pupil of the laser scanner is in-coupled into the waveguide efficiently such that the image is not vignetted.

The passage of the light through the laser scanning system is controlled by the polarising beam splitters and quarter waveplate optical components.

The first and second polarising beam splitters allow the light incident on them to either pass through, or be reflected, depending on the polarisation of the incident light. This ensures that the light is incident sequentially on the first, second and third mirrors before being incident into the waveguide.

The quarter waveplates change the polarisation state of the light from linearly polarised to circularly polarised, and vice versa. The arrangements of quarter waveplates may be such that the beams of light when incident on at least one of the first, second and third mirrors is circularly polarised. In particular, the arrangements of the quarter waveplates may be such that the light is linearly polarised when incident on the second polarising beam splitter after being reflected from each of the first, second and third mirrors.

The exit pupil formed at the laser scanner is relayed into the waveguide such that the exit pupil is formed at a position within the waveguide. This might be at the input of the waveguide. Alternatively, the exit pupil might be formed at any other position within the waveguide. For a single waveguide the exit pupil may be formed at the input grating of the waveguide. This may enable optimum efficiency of coupling in of the light. Where the waveguide is a stack of waveguides the exit pupil may be formed at a positon somewhere between the input of the first waveguide in the waveguide stack and the final waveguide in the waveguide stack.

The input may be an input grating of the waveguide. The input grating couples the light into the waveguide. Alternatively, the input may be a lens, or reflector that is suitable for coupling the light into the waveguide.

Preferably, two of the first, second, or third mirrors each have a principal axis that is orthogonal to a principle axis of the other mirror.

For instance, the first mirror may have a principal axis arranged in a first direction, and the second and third mirrors may have a principal axis that is arranged in a second direction that is orthogonal to the first direction. In this way, the second and third mirrors are facing each other with the first mirror arranged substantially perpendicular to the second and third mirrors. The polarising beam splitters may be used to direct the light between the mirrors.

At least one of the first, second or third mirrors may be concave. This causes the light to converge when it is reflected off the concave mirrors. This enables the diverging light from the laser scanner to be converged such that it can be coupled into the waveguide. Preferably, the first and third mirrors are concave. In this way, this causes the light to converge when it is reflected off the first and/or third mirrors.

Preferably, at least one of the first, second or third mirrors is convex. In this way, this causes the beams of light to diverge when reflected off the convex mirror. This enables a compact design of the laser scanning projection system. Preferably, the second mirror is convex. By having a convex second mirror the converging light reflected from the first mirror can be reflected off the second mirror such that it is diverging.

Preferably, at least two of the first, second or third mirrors have a different focal length to each other. In this way this allows control of the exit pupil size, at the input grating. The focal length may have a range of −0.5 mm to −infinity, or +0.5 mm to +infinity.

The difference in focal length may be achieved through the mirrors having different radii of curvature to each other. The radius of curvature of the mirrors affects the amount of convergence or divergence of the light. For a concave mirror a larger radius of curvature results in less convergence than a mirror having a smaller radius of curvature. For a convex mirror a larger radius of curvature results in less divergence than a smaller radius of curvature.

In other arrangements, one of the mirrors may be flat and have infinite radius of curvature. This may be used where it is not necessary to correct for astigmatism. The flat mirror may be the second mirror.

In other arrangements the difference in focal length may be achieved by the mirrors being made from glass with different index of refraction to each other. In this way, at least one of the first, second or third mirrors may be made of a glass which has a different index of refraction to the glass of the other mirrors. Alternatively, or in addition, one or more of the polarising beam splitters may be made with a glass with a different index of refraction.

The polarising beam splitters and/or first, second, or third mirrors may be made from any type of optical glass. This may include any clear homogeneous glass of known refractive index used in the construction of lenses. For instance, the mirrors may be made from an optical borosilicate-crown glass, otherwise known as N-BK7. Alternatively, any other type of glass, polymer, or other optically transparent material may be used.

In some arrangements, at least two of the first, second or third mirrors may have a different focal length to each other. In this way, by having a differential between the focal length of at least two of the mirrors resolution enhancements may be achieved. This enables control of the pupil size relayed into the waveguide. In some arrangements the first and the third mirrors may have a different focal length to each other. This can increase the size of the image of the exit pupil formed at the waveguide. This can lead to an improvement in the resolution at the waveguide. In addition, this can result in a reduction of waveguide artefacts, such as banding in thicker substrates. In other arrangements, all of the first, second and third mirrors may have a different focal length to each other. The difference in focal length may be achieved by many different ways. For instance, a difference in radius of curvature of the mirrors, or by having the mirrors or polarising beam splitters made of a glass with a different refractive index, as explained above.

The second polarising beam splitter may be in contact with the mirrors such that there is no air gap between the second polarising beam splitter and the mirrors. In other arrangements, one or more of the mirrors may be spaced apart from the second polarising beam splitter, such that there is an airgap between the second polarising beam splitter and the one or more mirrors. Advantageously, having this airgap may help with manufacturing tolerances. In one arrangement there may be an airgap between the third mirror and the second polarising beam splitter. In this arrangement, it is possible to maintain the input exit pupil formed at the laser scanner and the exit pupil relayed into the waveguide to be the same size (i.e. 1× magnification) by having the focal length of the first, second and third mirrors different to one another. This may alternatively be achieved through having an airgap between the first or second mirror and the second polarising beam splitter.

Preferably, the exit pupil relayed into the waveguide is larger than the exit pupil formed at the laser scanner. In other arrangements the exit pupil relayed into the waveguide may be the same size as the exit pupil formed at the laser scanner (i.e. a 1× magnification). The size of the exit pupil, relayed into the waveguide can be controlled such that it is optimised for desired characteristics of the waveguide. It may be controlled to ensure in-coupling into the input grating or to a particular position within the waveguide. This ensures that no light is lost and maximises efficiency and uniformity. In other arrangement the exit pupil relayed into the waveguide may be smaller than the exit pupil formed by the laser scanner.

Preferably, the laser source is a RGB laser source. In this way, the laser scanning projection system enables a full colour image to be formed. Alternatively, the laser source may be a monochromatic laser source, or a polychromatic laser source. For instance, the laser source is not limited to RGB and any other colours may be used. The laser source may in some arrangements be a super luminescent diode.

The laser scanning mirror may be a micro-electro-mechanical system (MEMS) device. The scanning mirror may be a galvometer (galvo) scanning mirror. Alternatively, any type of reflective or refractive scanning element may be used.

Any of the first, second or third mirrors may be spherical, aspherical, parabolic, or freeform mirrors.

The size of the laser scanning projection system may in some arrangements may be on the order of 10 mm. In other arrangements it may be larger, for instance on the order of 100 mm or more. In other arrangements it may be smaller, for instance on the order of 1 mm or less.

According to an aspect of the invention there is provided a Virtual Reality or Augmented Reality headset comprising: a laser scanning projection system for use in illuminating a waveguide, the laser scanning projection system as set out in the above aspect.

According to an aspect of the invention there is provided a method of illuminating a waveguide of an augmented reality or virtual reality headset, using a laser scanning projection system; the method comprising: emitting light from a laser source; receiving at a first polarising beam splitter the light from the laser source; receiving at a first quarter waveplate the light from the first polarising beam splitter; receiving the light at a laser scanner comprising a scanning mirror that is pivotably mounted, the light received from the first quarter waveplate and directing the light across an angular field of view, thereby to form an exit pupil; receiving the light at a second polarising beam splitter from the laser scanner, via the first quarter waveplate and the first polarising beam splitter; receiving the light at a second quarter waveplate, arranged at a first face of the second polarising beam splitter, the light received from the second polarising beam splitter; receiving the light at a first mirror, arranged at the first face of the second polarising beam splitter, the light received from the second polarising beam splitter via the second quarter waveplate, and reflecting the light towards the second polarising beam splitter via the second quarter waveplate; receiving the light at a third quarter waveplate, arranged at a second face of the second polarising beam splitter, the light received from the second polarising beam splitter; receiving the light at a second mirror, arranged at the second face of the second polarising beam splitter, the light received from the second polarising beam splitter via the third quarter waveplate after having being reflected by the first mirror, and the second mirror reflecting the light towards the second polarising beam splitter via the third quarter waveplate; receiving at a fourth quarter waveplate, arranged at a third face of the second polarising beam splitter, the light from the second polarising beam splitter; receiving the light at a third mirror, arranged at the third face of the second polarising beam splitter, the light received from the second polarising beam splitter via the fourth quarter waveplate after having being reflected by the second mirror, and the third mirror reflecting the light towards the second polarising beam splitter via the fourth quarter waveplate; receiving at an input of a waveguide the light from the first polarising beam splitter via the second polarising beam splitter after having been reflected by the third mirror such that the exit pupil formed at the laser scanner is relayed into the waveguide.

DETAILED DESCRIPTION

Figure 1:
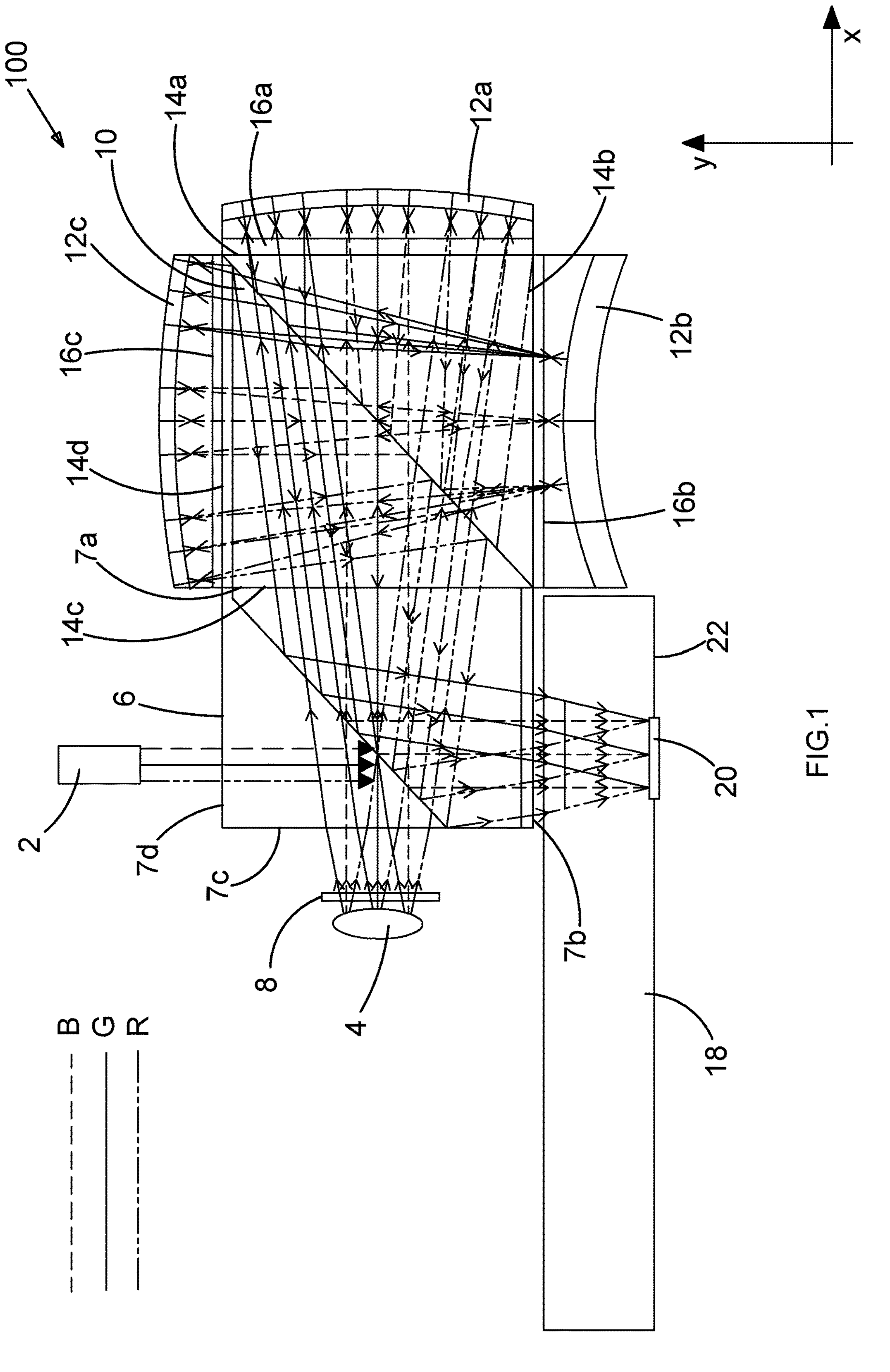
FIG. 1 is a schematic view of the laser scanning projection system in an embodiment of the invention.

FIG. 1 shows a laser scanning projection system 100 of the present invention.

A RGB laser source 2 is arranged directed to emit light in a first direction. In the arrangement shown in FIG. 1 the first direction is along the y-axis. A laser scanner 4 is spaced apart from the laser source 2. The laser scanner 4 is separated from the laser source 2 along the x and y axis in the negative x and y direction. The laser scanner 4 is arranged to reflect light substantially in a second direction perpendicular to the first direction, i.e. substantially along the x-axis.

A first polarising beam splitter 6 is located between the laser source 2 and the laser scanner 4. The first polarising beam splitter 6 has a first 7*a*, second 7*b*, third 7*c*, and fourth face 7*d*. The first 7*a* and third 7*c* faces are in a parallel plane to each other. The second 7*b* and fourth 7*d* faces are in parallel plane to each other. The first 7*a* and third 7*c* faces are in an orthogonal plane to the second 7*b* and fourth faces 7*d*.

The laser source is arranged at the fourth face 7*d* of the first polarising beam splitter 6. The laser scanner is arranged at the third face 7*c* of the first polarising beam splitter 6.

Between the first polarising beam splitter 6 and the laser scanner 4 is located a first quarter waveplate 8.

A second polarising beam splitter 10 is located adjacent to the first polarising beam splitter 6 at its first face 7*a* furthest from the laser scanner 4 along the optical path. The second polarising beam splitter 10 is further along the positive x-axis than the first polarising beam splitter 6.

The second polarising beam splitter 10 has a first 14*a*, second 14*b*, third 14*c*, and fourth face 14*d*. The first 14*a* and third 14*c* faces are in a parallel plane to each other. The second 14*b* and fourth 14*d* faces are in parallel plane to each other. The first 14*a* and third 14*c* faces are in an orthogonal plane to the second 14*b* and fourth faces 14*d*.

Three mirrors 12*a*, 12*b*, 12*c*, are arranged around the second polarising beam splitter 10 at three of its faces.

The first mirror 12*a* is located at the first face 14*a* of the second polarising beam splitter 10. The first mirror 12*a* is concave. The first face 14*a* is the face furthest from the laser scanner 4 along the optical path. The principal axis of the first mirror 12*a* is directed along the x axis.

The second mirror 12*b* is located at the second face 14*b* of the second polarising beam splitter 10. The second mirror

12*b* is convex. The principal axis of the second mirror 12*b* is orthogonal to the principal axis of the first mirror 12*a*. The principal axis of the second mirror 12*b* is directed along the y-axis.

The third mirror 12*c* is located at the fourth face 14*d* of the second polarising beam splitter 10. The third mirror 12*c* is concave. The principal axis of the third mirror 12*c* is parallel to the principal axis of the second mirror 12*b*. The principal axis of the third mirror 12*c* is directed along the y-axis.

Between each of the mirrors 12*a*, 12*b*, 12*c* and the second polarising beam splitter 10 is a quarter waveplate 16*a*, 16*b*, 16*c*.

A waveguide 18 is arranged having its largest axis parallel to the x-axis. The waveguide has an input grating 20 located at the input end 22 of the waveguide 18. The input end 22 of the waveguide 18 is located at the second face 7*b* of the first polarising beam splitter 6.

The path of the light through the laser scanning projection system 100 will now be described with reference to FIGS. 1 to 5.

FIG. 1 shows the complete light ray path through the laser scanning projection system 100. FIGS. 2 to 5 show a portion of the light ray path showing a portion of the laser projection system 100.

As can be seen in FIG. 1 the laser source 2 emits light along the y-axis. The light is incident on the first polarising beam splitter 6 at its fourth face 7*d*. As the light is linearly polarised in the S polarisation state it is reflected by the first polarising beam splitter 6. The first polarising beam splitter 6 causes the light to be reflected along the x-axis such that it exits the first polarising beam splitter 6 at its third face 7*c*.

The light is then incident on the quarter wave plate 8. The quarter waveplate 8 changes the linearly polarised light to circularly polarised light. The light is then incident on the laser scanner 4.

The laser scanner 4 includes a mirror which is mounted on a pivot. The mirror scans along the y-axis across an angular field of view, creating an exit pupil. The light reflected by the laser scanner 4 is diverging. Upon reflection the handedness of the polarisation changes.

Figure 2:
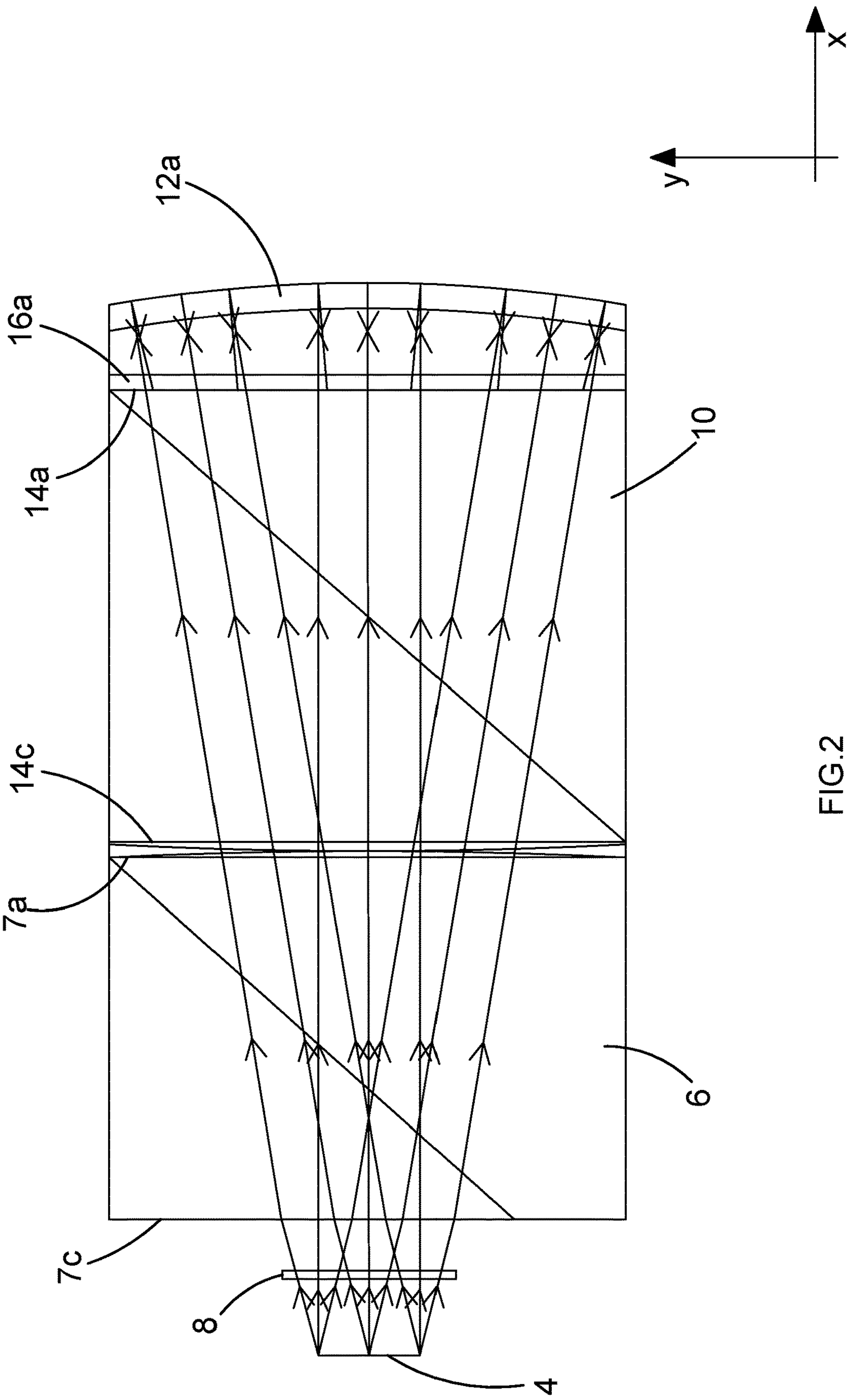
FIGS. 2 to 5 are schematic views of portions of the laser scanning projection system in an embodiment of the invention showing the path of the light as it passes through the system.

As can be seen from FIG. 2, the light from the laser scanner 4 then passes back through the quarter waveplate 8. The quarter waveplate 8 changes the light from circularly polarised light to linearly polarised light in the P polarisation state. The light is then incident on the third 7*c* face of the first polarising beam splitter 6. As the light is in the P polarisation state the light passes straight through the first polarising beam splitter 6 exiting at its first 7*a* face. The light then passes through the third face 14*c* of the second polarising beam splitter 10. As is the case with the first polarising beam splitter 6 as the light is in the P polarisation state the light passes straight through the second polarising beam splitter 10 exiting at its first 14*a* face.

The light then passes through a quarter waveplate 16*a*. The quarter waveplate 16*a* changes the light from linearly polarised light to circularly polarised light.

Figure 3:
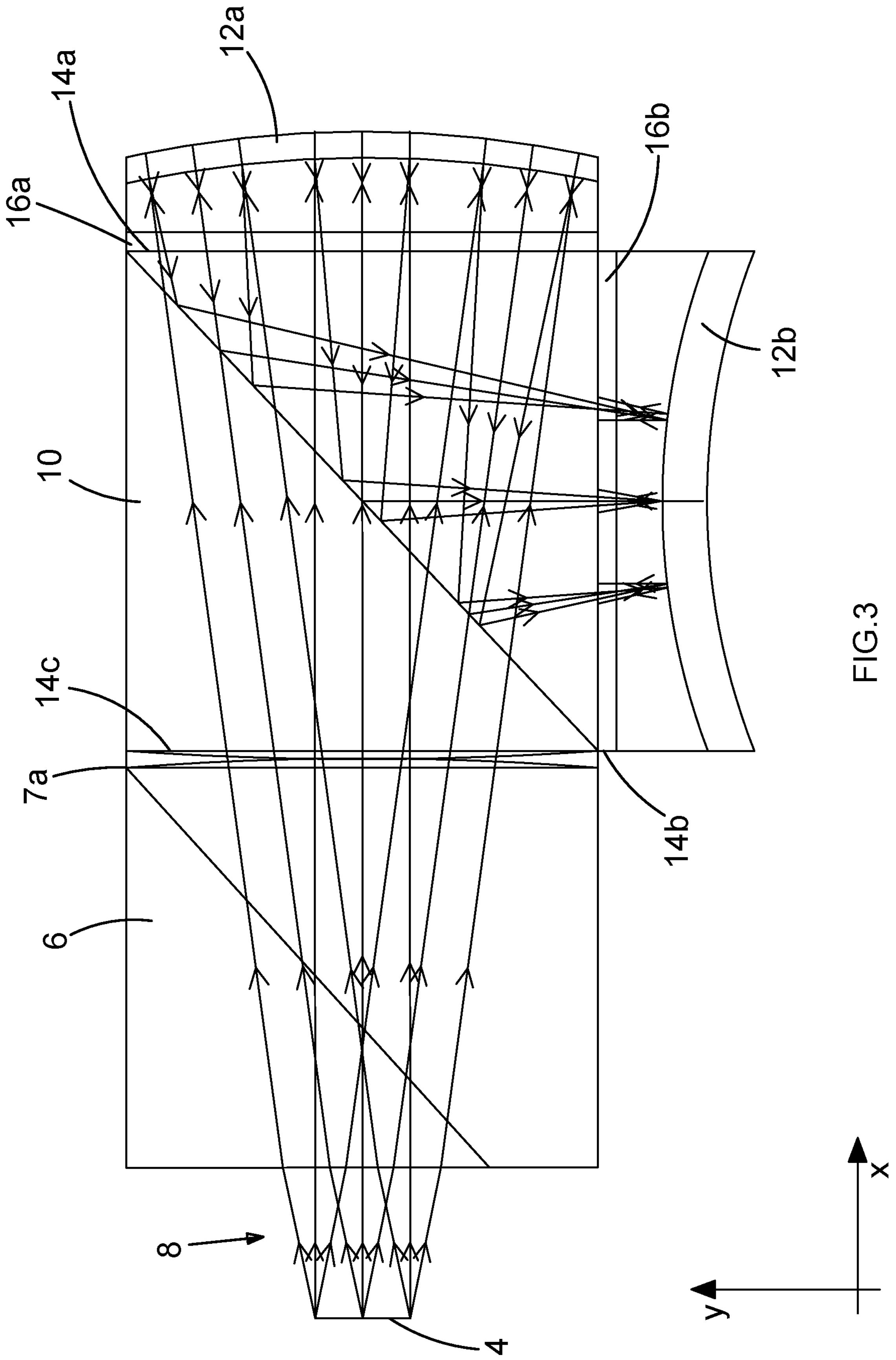

The light is then incident on the first mirror 12*a*. As can be seen in FIG. 3 the light is reflected by the first mirror 12*a* back towards the second polarising beam splitter 10. The reflected light is now converging. The light reflected by the first mirror 12*a* passes again through the quarter waveplate 16*a*. The quarter waveplate 16*a* changes the circularly polarised light into linearly polarised light in the S polarisation state.

The light then passes into the second polarising beam splitter 10 through the first face 14*a*. As the light is in the S polarisation state it is reflected along the y axis to exit the second face 14*b* of the second polarising beam splitter 10.

The light then passes through the quarter waveplate 16*b*. The quarter waveplate 16*b* changes the light from linearly polarised light to circularly polarised light.

Figure 4:
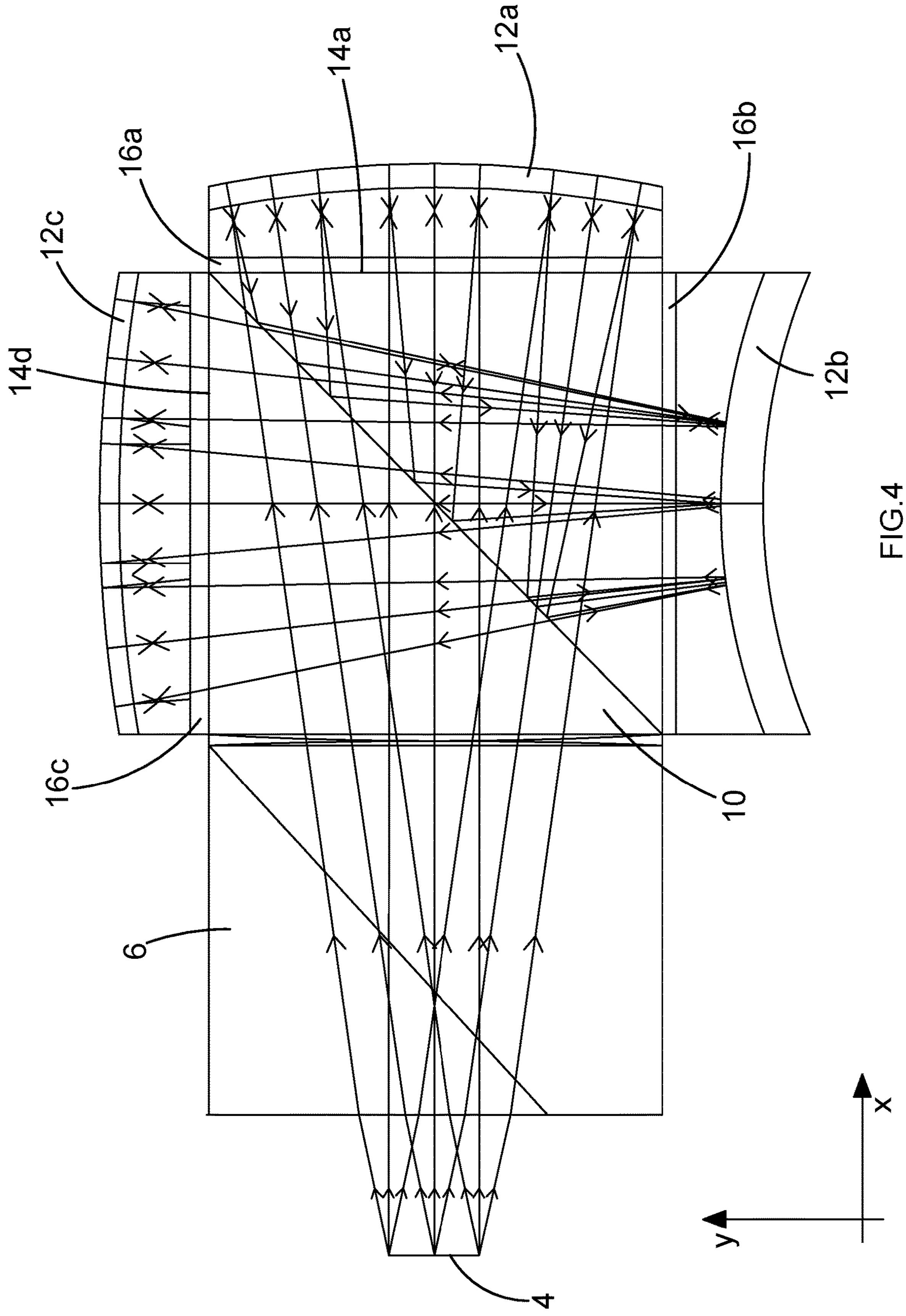

The light is then incident on the second mirror 12*b*. As can be seen in FIG. 4, the light is reflected by the second mirror 12*b* back towards the second polarising beam splitter 10. The reflected light is now diverging. The light reflected by the second mirror 12*b* passes again through the quarter waveplate 16*b*. The quarter waveplate 16*b* changes the circularly polarised light into linearly polarised light in the P polarisation state.

The light then passes into the second polarising beam splitter 10 through the second face 14*b*. As the light is in the P polarisation state it travels through the second polarising beam splitter 10 along the y axis to exit the fourth face 14*d* of the second polarising beam splitter 10.

The light then passes through a quarter waveplate 16*c*. The quarter waveplate 16*c* changes the light from linearly polarised light to circularly polarised light.

Figure 5:
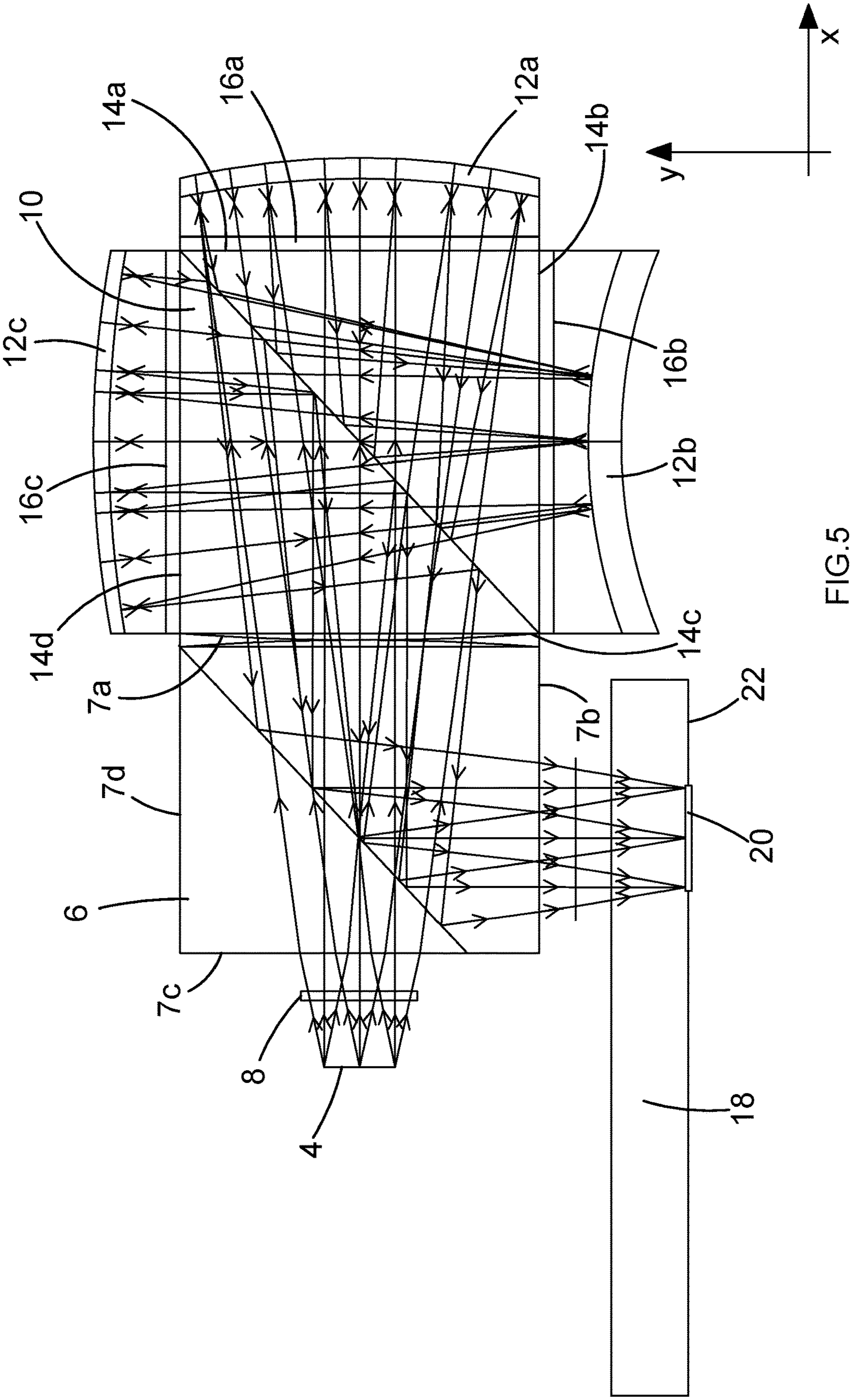

The light is then incident on the third mirror 12*c*. As can be seen in FIG. 5, the light is reflected by the third mirror 12*c* back towards the second polarising beam splitter 10. The reflected light is now converging. The light reflected by the third mirror 12*c* passes again through the quarter waveplate 16*c*. The quarter waveplate 16*c* changes the circularly polarised light into linearly polarised light in the S polarisation state.

The light then passes into the second polarising beam splitter 10 through the fourth face 14*d*. As the light is in the S polarisation state it is reflected along the x axis to exit the third face 14*c* of the second polarising beam splitter 10.

The light then passes into the first polarising beam splitter 6 through its first face 7*a*. As the light is in the S polarisation state it is reflected along the y-axis to exit the second face 7*b* of the first polarising beam splitter 6.

The light is then incident on the input grating 20 of the waveguide 18. As can be seen from FIG. 5 all of the light is coupled into the input grating 20. This causes the exit pupil of the laser scanner to be relayed onto the input grating 20.

The laser scanning projection system 100 described above provides a compact way of coupling the light from the laser scanner 4 into the waveguide 18. This enables its use for headmounted augmented reality displays (HMD). In addition, as the mirrors 12*a*, 12*b*, and 12*c* are on-axis with the light that is incident on them they are less prone to aberrations that can occur when the mirrors are arranged with off-axis illumination.

Figure 6:
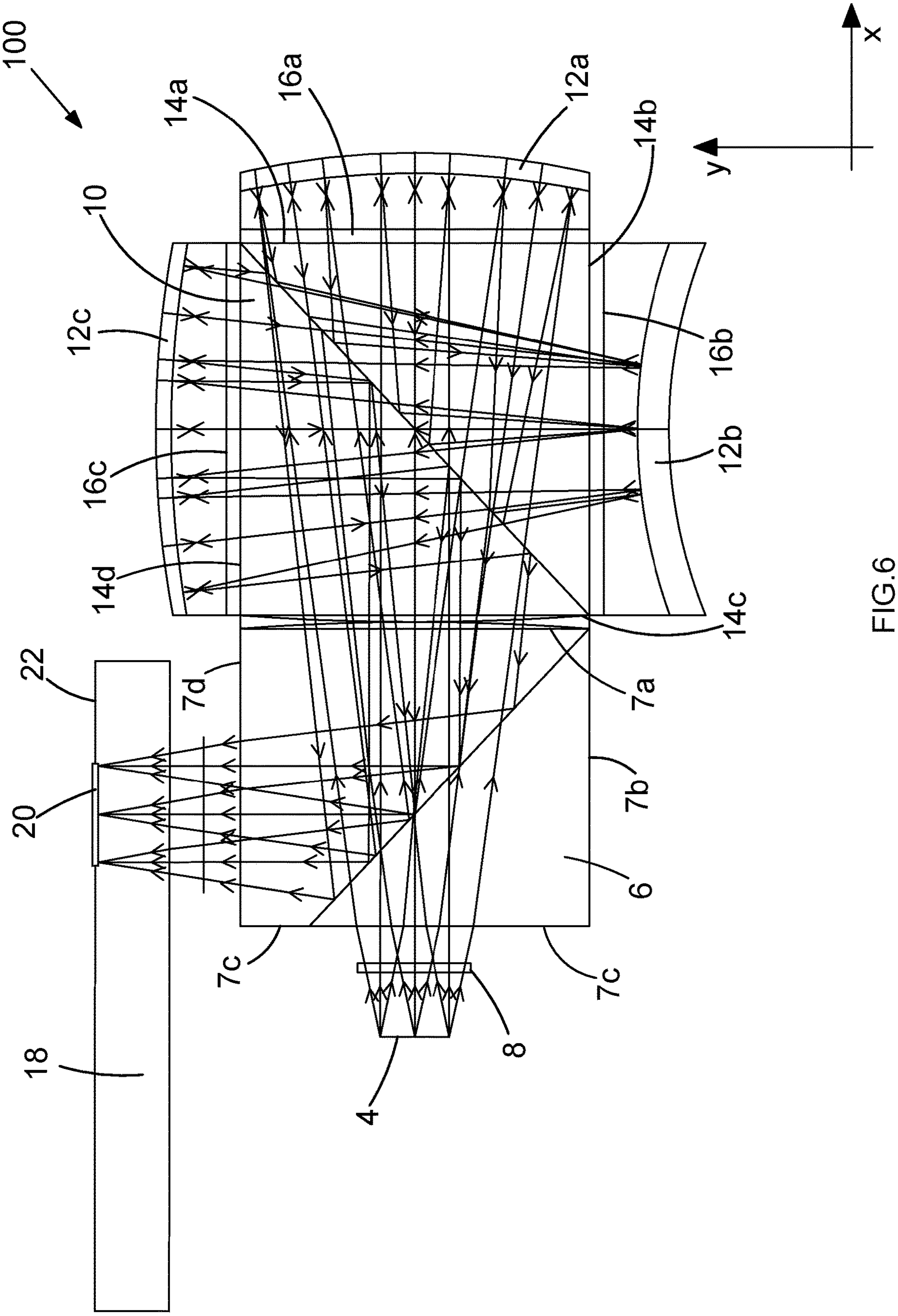
FIG. 6 is a schematic view of a portion of the laser scanning projection system in a further embodiment of the invention showing the path of the light as it passes through the system.

FIG. 6 shows a further arrangement of the laser scanning projection system. The components are given the same reference number as to those shown in FIGS. 1 to 5. This arrangement differs in that the first polarising beam splitter 6 is arranged such that its central reflective axis is oriented in a different orientation to that of the second polarising beam splitter. The first polarising beam splitter is orientated at 180° compared to the first polarising beam splitter shown in FIGS. 1 to 5. This causes the path that the light takes through the system to differ to that of the light path in FIGS. 1 to 5. The path that the light takes is the same as in FIGS. 1 to 5 until the final reflection out of the first polarising beam splitter 6. In FIG. 6 the light, after being reflected by each of the mirrors 12*a* 12*b* 12*c* as described above, is then reflected such that it exits the first polarising beam splitter through side 7*d*, before being incident on the waveguide (not shown). Of course, although not shown, the laser source 2 in FIG. 6 would instead be located at a different side of the first polarising beam splitter to that shown in FIG. 1, such as at side 7*b*.

In other arrangements, the first polarising beam splitter 6 may instead be orientated at any angle with respect to the first polarsing beam splitter shown in FIGS. 1 to 5. In one arrangement the first polarising beam splitter 6 may be originated at 90° with respect to the first polarising beam splitter 6 shown in FIGS. 1 to 5. In this arrangement a half waveplate would be required between the first polarising beam splitter and the second polarising beam splitter.

With the laser scanning projection system 100 of the present invention it is possible to control the size of the exit pupil relayed into waveguide 18. This may be achieved by varying the focal length the mirrors 12*a* 12*b* 12*c*, e.g. by varying their curvature.

For instance, the size of the relayed pupil can be increased, such that it is larger than the pupil formed at the laser scanner. This has a benefit of reducing waveguide artefacts, such as banding in thicker substrates.

In addition, it is possible to alter the resolution achieved when using the laser scanning projection system 100 of the present invention by having a larger exit pupil. Laser scanning projectors typically are limited by their narrow beam width. When directly viewed by an eye of the viewer the laser under fills the lens of the eye. This can be seen by looking at the standard Rayleigh criterion in the equation below $$\theta = 1.22\frac{\lambda}{D}$$

Where θ is the angular resolution in radians, A is the wavelength of light in meters, and D is the diameter of the lens aperture in meters. With, the laser underfilling the lens of the eye this reduces D in the above equation. This limits the resolution achieved.

Example 1: Focal Length of the First Mirror 12*a* and the Third Mirror 12*c* the Same, Resulting in No Pupil Magnification The field of view achieved at the scanner is 35.4°
The field of view achieved at the waveguide is 35.4°
The size of the relayed exit pupil is 1 mm
Diffraction limited resolution at 550 nm=2.3 arc minutes.

Example 2: Focal Length of the First Mirror 12*a* and the Third Mirror 12*c* NOT the Same, Results in a 1.4× Pupil Magnification The field of view achieved at the scanner is 35.4°
The field of view achieved at the waveguide is 25° The size of the relayed exit pupil is 1.4 mm
The size of the relayed exit pupil is 1.4 mm
Diffraction limited resolution at 550 nm=1.65 arc minutes As can be seen above in example 1, the focal lengths of the first mirror 12*a* and the third mirror 12*c* are the same such that the relayed exit pupil has a diameter of 1 mm and the magnification of the relay is 1×. Whereas a larger relayed exit pupil of 1.4 mm is achieved in example 2 by varying the focal length of the first mirror 12*a* and the third mirror 12*c* such that they are not the same so the magnification of the relay is 1.4×.

As can be seen from the above examples, the system can be designed such that the relayed exit pupil is magnified, and necessarily the field of view is reduced. Therefore, the resolution enhancement that is achieved is at the expense of the field of view. However, for certain applications this improvement in resolution outweighs the loss of field of view.

Varying the focal length of mirror 12*a* and the third mirror 12*c* may be achieved by having a radius of curvature of the first mirror 12*a* that is different to the radius of curvature of the third mirror 12*b*. For instance, in a typical illustrative example the radius of curvature of each of the mirrors may be: first mirror 12*a* R=12.25 mm, second mirror 12*b* R=6.47 mm, third mirror 12*c* R=15.46 mm. With this arrangement for an input pupil diameter of 1 mm an exit pupil of diameter 1.55 mm is achieved. These values are merely illustrative and could be increased by one or more orders of magnitude.

Alternatively, varying the focal length may be achieved by other means, such as by having mirrors with different refractive index glasses to one another.

In other arrangements, there may be a plurality of waveguides 18 in the form of a waveguide stack, the waveguides stacked along the y-direction. The laser scanning projection system enables the exit pupil to be relayed at an optimum position with respect to the waveguides in the waveguide stack. This may not necessarily be at the input grating of one of the waveguides, as outlined above. Instead it may be beneficial to relay the exit pupil in-between the waveguides in the stack. For two waveguides this might be exactly half way between the respective input gratings on each guide. Alternatively the exit pupil may be relayed to form at a particular one of the waveguides of the stack. This might be to target the less efficient waveguide, which may provide an improved performance of the system.

The waveguide stack may include a red waveguide, a green waveguide and a blue waveguide. If it is desirable to control the efficiency of one of the waveguides of a particular colour, the exit pupil may be relayed such that it forms within that particular waveguide. Alternatively, the exit pupil may be relayed onto the input grating of the first waveguide in the waveguide stack in a similar way as shown in FIGS. 1 to 6.

The polarising beam splitters shown in FIGS. 1 to 6 are polarising beam splitter cubes. The diagrams above describe four faces of the polarising beam splitters. However, it would be understood to the skilled person that the polarising beam splitter may have further faces. The described arrangement is the arrangement when viewed in the 2D plane, with the polarising beam splitter cubes arranged such that they direct the light in the manner described above.

The invention also includes numerous modifications and variations to the above-described methods and apparatus.

The laser scanning projection system may be used for augmented reality or virtual reality head mounted displays. Alternatively they may be used for any type of augmented reality or virtual reality displays.

The laser source described in the above arrangement is an RGB laser. However the laser scanning projection system may be used with any type of lasers depending on the use required. This may be any type of visible wavelength source. For instance, in other arrangements the laser may be a monochromatic laser source.

The input grating may not necessarily be an input grating of the waveguide. It may alternatively be any input that couples the light into the waveguide. For instance, it may be a lens, or reflector that is suitable for coupling the light into the waveguide.

The waveguide may be any type of waveguide that is configured to receive light. In some arrangements the waveguide may be a diffractive waveguide. In other arrangements the waveguide may be a reflective waveguide.

The arrangement of the optics of the laser scanning projection system may be modified according to the requirements of its use. For instance, the first, second and third mirrors may be positioned at alternative faces of the second polarising beam splitter to the arrangement described. Alternatively, the polarisation of the light may be altered such that it takes a different path through the laser scanning projection system. For instance, the light may first be incident on the third mirror rather than the first mirror by having a different initial polarisation state.

In addition, additional optical components may be inserted into the laser scanning projection system described above. For instance, a further mirror, polarising beam splitter, quarter waveplate or other optical component may be inserted. This may cause a directional change in the light path. In other arrangements the optical components may be substituted with other optical components that achieve the same or a similar effect. For instance, the quarter waveplates may be removed, replaced or repositioned. In addition, or alternatively, additional lenses may be included before or after the relay. These lenses may aid to correct for aberrations.

Where it is described above a component has received light from another component it is not necessarily that the light is received directly from that component. In some alternative arrangements the light may interact with an additional intermediate component before it is incident on the final component.

The invention claimed is:

1. A laser scanning projection system comprising:
- a laser source configured to emit light;
- a first polarizing beam splitter configured to receive the light from the laser source;
- a first quarter waveplate configured to receive the light from the first polarizing beam splitter;
- a laser scanner comprising a scanning mirror that is pivotably mounted, the laser scanner being configured to receive the light from the first quarter waveplate and direct the light across an angular field of view, thereby to form an exit pupil; and
- a second polarizing beam splitter assembly comprising a second polarizing beam splitter, the second polarizing beam splitter assembly being configured to receive the light from the laser scanner via the first polarizing beam splitter and the first quarter waveplate, reflect the light an odd number of times, and direct the light toward the first polarizing beam splitter.

2. The laser scanning projection system of claim 1, further comprising:
- a waveguide comprising an input, the input being configured to receive the light from the second polarizing beam splitter assembly via the first polarizing beam splitter such that the exit pupil formed at the laser scanner is relayed into the waveguide.

3. The laser scanning projection system of claim 1, wherein the second polarizing beam splitter assembly comprises first, second, and third mirrors, and the odd number of times is three.

4. The laser scanning projection system of claim 3, wherein the second polarizing beam splitter assembly further comprises second, third, and fourth quarter waveplates configured to receive light before and after reflection from the first, second, and third mirrors, respectively.

5. The laser scanning projection system of claim 4, wherein the second polarizing beam splitter assembly comprises:
- the second polarizing beam splitter, configured to receive the light from the laser scanner, via the first quarter waveplate and the first polarizing beam splitter;
- the second quarter waveplate, arranged at a first face of the second polarizing beam splitter, configured to receive the light from the second polarizing beam splitter;
- the first mirror arranged at the first face of the second polarizing beam splitter, the first mirror configured to receive the light from the second polarizing beam splitter via the second quarter waveplate, and to reflect the light towards the second polarizing beam splitter via the second quarter waveplate;
- the third quarter waveplate, arranged at a second face of the second polarizing beam splitter configured to receive the light from the second polarizing beam splitter;
- the second mirror arranged at the second face of the second polarizing beam splitter, the second mirror configured to receive the light from the second polarizing beam splitter via the third quarter waveplate after having been reflected by the first mirror, the second mirror configured to reflect the light towards the second polarizing beam splitter via the third quarter waveplate;
- the fourth quarter waveplate, arranged at a third face of the second polarizing beam splitter, configured to receive the light from the second polarizing beam splitter; and
- the third mirror arranged at the third face of the second polarizing beam splitter, the third mirror configured to receive the light from the second polarizing beam splitter via the fourth quarter waveplate after having been reflected by the second mirror, the third mirror configured to reflect the light towards the second polarizing beam splitter via the fourth quarter waveplate.

6. The laser scanning projection system of claim 3, wherein two of the first, second, or third mirrors each have a principal axis that is orthogonal to a principal axis of another of the two mirrors.

7. The laser scanning projection system of claim 6, wherein the first mirror has a principal axis arranged in a first direction, and the second and third mirrors have a principal axis that is arranged in a second direction that is orthogonal to the first direction.

8. The laser scanning projection system of claim 3, wherein at least one of the first, second or third mirrors are concave.

9. The laser scanning projection system of claim 3, wherein at least one of the first, second or third mirrors is convex.

10. The laser scanning projection system of claim 3, wherein at least two of the first, second or third mirrors have a different focal length to each other.

11. The laser scanning projection system of claim 10, wherein the different focal length is achieved through the mirrors having different radii of curvature to each other, or made from glass with different index of refraction to each other.

12. The laser scanning projection system of claim 2, wherein the exit pupil relayed into the waveguide is larger than the exit pupil formed at the laser scanner.

13. The laser scanning projection system of claim 1, wherein the laser source is a RGB laser source.

14. The laser scanning projection system of claim 3, wherein any of the first, second or third mirrors are spherical, aspherical, parabolic, or freeform mirrors.

15. A Virtual Reality or Augmented Reality headset comprising:

a laser scanning projection system comprising:

a laser source configured to emit light;

a first polarizing beam splitter configured to receive the light from the laser source;

a first quarter waveplate configured to receive the light from the first polarizing beam splitter;

a laser scanner comprising a scanning mirror that is pivotably mounted, the laser scanner being configured to receive the light from the first quarter waveplate and direct the light across an angular field of view, thereby to form an exit pupil; and a second polarizing beam splitter assembly comprising a second polarizing beam splitter, the second polarizing beam splitter assembly being configured to receive the light from the laser scanner via the first polarizing beam splitter and the first quarter waveplate, reflect the light an odd number of times, and direct the light toward the first polarizing beam splitter; and a display comprising:

a waveguide comprising an input, the input being configured to receive the light from the second polarizing beam splitter assembly via the first polarizing beam splitter such that the exit pupil formed at the laser scanner is relayed into the waveguide.

16. A method of illuminating a waveguide of an augmented reality or virtual reality headset, using a laser scanning projection system; the method comprising:

emitting light from a laser source;

receiving, at a first polarizing beam splitter, the light from the laser source;

receiving, at a first quarter waveplate, the light from the first polarizing beam splitter;

receiving, at a laser scanner comprising a scanning mirror that is pivotably mounted, the light from the first quarter waveplate;

directing the light across an angular field of view using the laser scanner, thereby to form an exit pupil;

receiving, at a second polarizing beam splitter assembly comprising a second polarizing beam splitter, the light from the laser scanner via the first quarter waveplate and the first polarizing beam splitter;

reflecting the light an odd number of times by the second polarizing beam splitter assembly; and directing the light from the second polarizing beam splitter assembly toward the first polarizing beam splitter.

17. The method of claim 16, further comprising:

receiving, at an input of a waveguide, the light from the second polarizing beam splitter assembly via the first polarizing beam splitter such that the exit pupil formed at the laser scanner is relayed into the waveguide.

18. The method of claim 16, wherein the reflecting of the light an odd number of times by the second polarizing beam splitter assembly comprises:

reflecting the light from first, second, and third mirrors of the second polarizing beam splitter assembly.

19. The method of claim 18, further comprising:

receiving the light at a second quarter waveplate before and after reflection from the first mirror;

receiving the light at a third quarter waveplate before and after reflection from the second mirror; and receiving the light at a fourth quarter waveplate before and after reflection from the third mirror.

20. The method of claim 19, wherein:

the receiving of the light at the second polarizing beam splitter assembly comprises:

receiving the light at a second polarizing beam splitter from the laser scanner, via the first quarter waveplate and the first polarizing beam splitter; and the reflecting of the light an odd number of times by the second polarizing beam splitter assembly comprises:

receiving the light at a second quarter waveplate, arranged at a first face of the second polarizing beam splitter, the light received from the second polarizing beam splitter;

receiving the light at a first mirror, arranged at the first face of the second polarizing beam splitter, the light received from the second polarizing beam splitter via the second quarter waveplate, and reflecting the light towards the second polarizing beam splitter via the second quarter waveplate;

receiving the light at a third quarter waveplate, arranged at a second face of the second polarizing beam splitter, the light received from the second polarizing beam splitter;

receiving the light at a second mirror, arranged at the second face of the second polarizing beam splitter, the light received from the second polarizing beam splitter via the third quarter waveplate after being reflected by the first mirror, and the second mirror reflecting the light towards the second polarizing beam splitter via the third quarter waveplate;

receiving at a fourth quarter waveplate, arranged at a third face of the second polarizing beam splitter, the light from the second polarizing beam splitter; and receiving the light at a third mirror, arranged at the third face of the second polarizing beam splitter, the light received from the second polarizing beam splitter via the fourth quarter waveplate after being reflected by the second mirror, and the third mirror reflecting the light towards the second polarizing beam splitter via the fourth quarter waveplate.

* * * * *